Patented Apr. 22, 1952

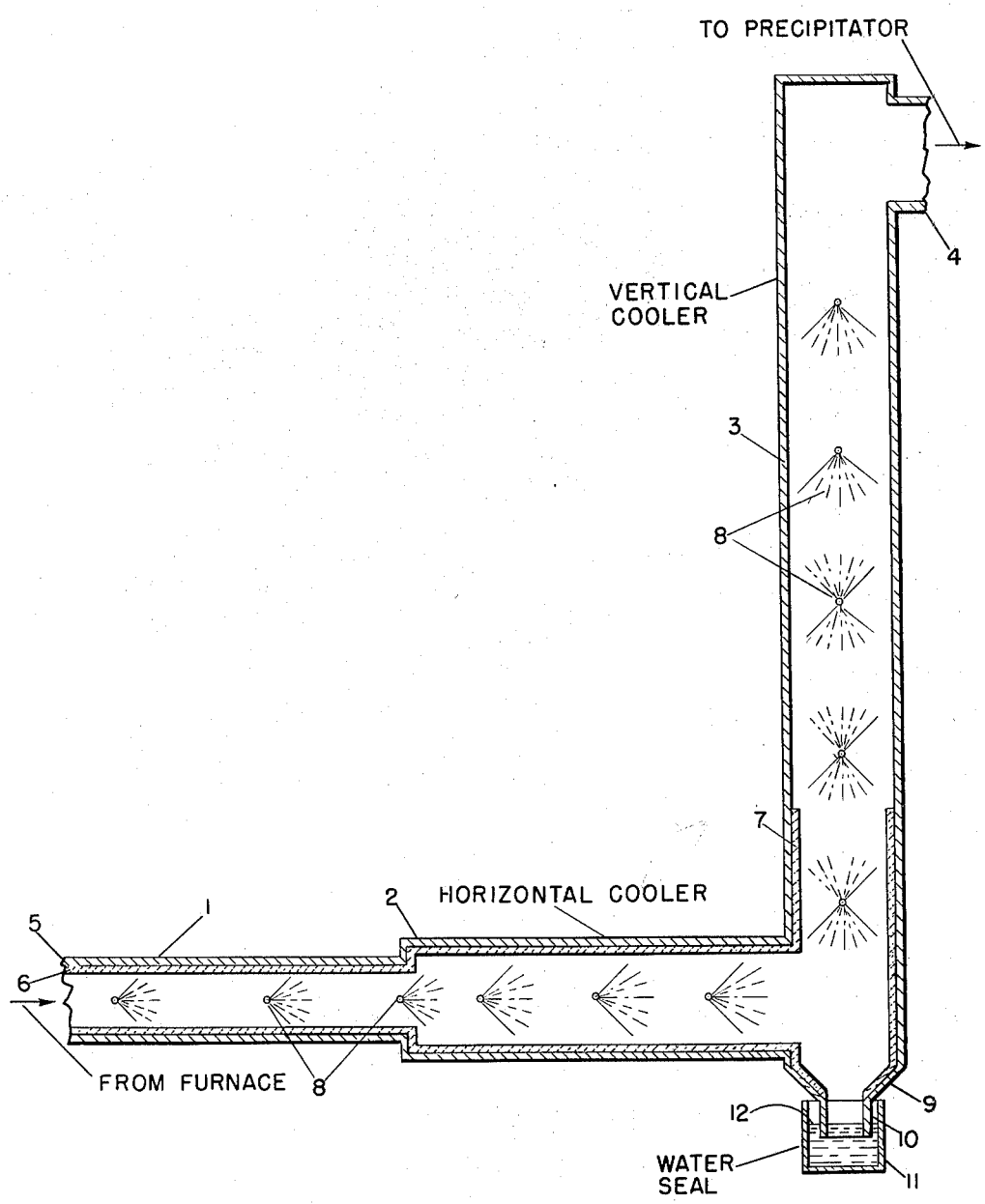

2,594,171

UNITED STATES PATENT OFFICE 2,594,171

PROCESS FOR COOLING HOT GASEOUS SUSPENSIONS OF CARBON BLACK

Maurice R. Howell, Monroe, La., assignor to Columbian Carbon Company, New York, N. Y., a corporation of Delaware Application January 20, 1950, Serial No. 139,750

3 Claims. (Cl. 23—209.6)

This invention relates to the manufacture of carbon black and, more particularly, to improvements in the manufacture of carbon black by the so-called furnace process.

A characteristic of this general type of process is that the black is carried out of the furnace in suspension in hot gases at temperatures usually upwards of 2,000° F. It is generally desirable rapidly to cool the gaseous suspension as it leaves the furnace and this is frequently accomplished by spraying water directly into the hot gases.

The cooling is in this way effected, of course, by absorption, either directly or indirectly from the gaseous suspension, of heat equivalent to the latent heat of vaporization required for the conversion of the spray water, or a portion thereof, to steam.

Though this water spray method of cooling the furnace effluent gases is widely used procedure in furnace black processes, its use has heretofore been subject to several distinct disadvantages. One disadvantage has been the very large amount of water required and another has been the excessive loss of carbon black carried down by unvaporized spray water.

I have found that, in spite of the fact that the temperature of the furnace effluent gases is far in excess of the boiling point of the cooling water, evaporation of the water is not instantaneous and indeed, considering the velocity of the gases, the vaporization of the water is relatively slow.

Using conventional water sprays, droplets of the water not yet vaporized impinge against the refractory lining of the gas flues or conduit causing localized cooling and gradual deterioration of the flue lining. When this occurs, heat required to vaporize the water is not absorbed directly from the effluent gases, but rather from the flue lining.

Further, I have frequently observed unvaporized spray water trickling from the bottom of horizontally disposed cooling conduits where the temperature within the conduit was well above 1,000° F. In vertically disposed cooling conduits, conventional design provides for the collection of black and unvaporized water at the lower end of the vertical cooler.

This method of operation is, therefore, not only wasteful of water, which is frequently quite an item of expense, but also decreases the yield of carbon black per thousand cubic feet of natural gas, for instance, by the carrying off of an appreciable portion of the carbon black produced in the form of a slurry.

I have discovered that the difficulties heretofore experienced in using water sprays for cooling furnace effluent gases may be, in large measure, if not completely, eliminated by injecting the water into the hot gases in the form of a fog. It will be understood that the term "fog" is used herein and in the appended claims to define a fine mist of water particles of a mean diameter not exceeding 80 microns and including such mists in which the mean diameter of the water particles is within the range of 40 to 80 microns.

The fog of my present invention is further distinguished from the conventional sprays by the fact that my water particles are so fine as to form an opaque cloud or obscuring screen, the water particles remaining in suspension until vaporized, while the conventional sprays are practically transparent.

My invention is independent of the means for producing the fog. Advantageously I may inject the water into the hot gases through nozzles or clusters of nozzles of the type currently used by fire departments in extinguishing fires and commonly designated "fog nozzles."

The pressure under which the water is sprayed will depend somewhat upon the particular type of nozzle used and the fineness of the fog particles desired. However, I have, with advantage, used for this purpose water pressure of around 100 to 150 pounds per square inch.

Where the water is supplied as a fog, in accordance with my invention, it is rapidly and relatively completely flashed into vapor upon contact with the hot furnace gases. In this way, maximum heat absorption benefit is derived from each pound of water used and, further, a more accurate control of heat absorption from the hot gases is possible. By avoiding the passing of unvaporized water through the system, the amount of water may be substantially reduced and loss of carbon black as sludge substantially completely, if not completely, eliminated.

The invention will be more fully described and illustrated by reference to the accompanying drawing which represents conventionally and somewhat diagrammatically, an elevation section of the cooling conduits of a modern furnace black installation.

Hot furnace gases with carbon black suspended therein, pass from a furnace not shown at a temperature usually within the range of 2,200° F. to 2,500° F. into the upstream end of the cylindrical horizontal cooler 1 and passing through the cooler 1, the hot suspension enters an enlarged portion 2 of the horizontal cooler and, from thence, passes upwardly through the vertical cooler 3. From the top of the vertical cooler, the suspension at a substantially reduced temperature, say 500°–550° F., passes through conduit 4 to conventional precipitating and collecting apparatus.

The coolers 1 and 2 may be constructed of an outside metal casing 5 provided with a firebrick lining 6. The vertical cooler may, likewise, be fabricated of metal and partly lined with firebrick as indicated at 7.

Positioned in the cooling conduits at spaced intervals are the fog-throwing nozzles, diagrammatically indicated at 8. Water is supplied to the nozzles by suitable piping under adequate pressure to cause it to be forced through the nozzles as elsewhere herein described.

The arrangement and construction of the nozzles, per se, and the pipe connections leading thereto constitute no part of the present invention and, therefore, a more detailed description thereof is not necessary.

Further, the invention is independent of the precise positioning of the nozzles and the number and size of the nozzles used. Such details, as will be fully understood by the art, will vary depending upon the particular operation being carried on, including the volume, temperature, and composition of the effluent furnace gases.

In conventional operation, the lower end of the vertical cooler is provided with a water seal, such as indicated in the drawing. As there shown, the vertical cooler is provided with a lower conical portion 9 and a downwardly extending cylindrical portion 10 of reduced diameter which projects into the cooler tub 11 filled with water to a level such as indicated at 12 and at which the trough 11 is adapted to overflow.

As previously indicated, a primary advantage of my present invention is that, by reason of the very fine size of the water particles such water as is not instantly vaporized upon contact with the hot gases remains in suspension in the gas stream under the combined forces of Brownian movement and normal turbulence. Unvaporized water is thus carried along in suspension in the gas stream until nearly total vaporization thereof is effected. This, in part at least, accounts for the greater efficiency, with respect to cooling water requirement, and the longer life and lower upkeep costs of the apparatus provided by my present invention.

In operations of this sort, water is usually supplied in quantities just sufficient to effect the required reduction in temperature of the gaseous suspension before it reaches the precipitator. In conventional practice, as previously indicated, the cooling water supplied to the system is not fully utilized, large quantities of the water passing from the system without ever having been vaporized and consequently without removing from the system more than a very small proportion of the heat which it is capable of absorbing upon vaporization.

Further, in conventional operation, unvaporized water carrying with it carbon black knocked out of the suspension by the water flows along the lower end of the horizontal cooler 2 into the lower end of the vertical cooler. Any water unvaporized in the vertical cooler, likewise, collects in the lower portion thereof and flows as a slurry into the cooler tub 11 from which it is withdrawn and disposed of.

My invention will be illustrated and the advantages thereof demonstrated by the following specific examples of this application:

Example I

With apparatus such as represented by the drawing, except that it was equipped with conventional spray nozzles, instead of fog forming nozzles, it was found that with sufficient water to maintain the temperature of the gases passing to the precipitator at 520° F., unvaporized water at a rate in excess of 50,000 gallons per day flowed from the lower end of the vertical cooler. In an operation carried on under comparable conditions, except that the water was injected into the suspension in the form of a fog, the water loss was reduced to 4,713 gallons per day. Further, the loss of carbon in the first noted operation was 2,928 pounds per day, while in the operation carried on in accordance with my invention, this loss was reduced to 1,325 pounds per day.

Example II

In a different operation using apparatus somewhat similar to that of Example I, equipped with conventional spray nozzles, the water loss from the vertical cooler drains was found to be in excess of 50,000 gallons per day when the temperature of the gases to the precipitator were reduced to 520° F. By changing the method of injecting the cooling water into the suspension, in accordance with the present invention, the water loss was reduced to 3,927 gallons per day and the carbon black loss was reduced from 3,726 pounds per day to 1,397 pounds per day.

The utility of the present invention is not restricted to conventional coolers. It has heretofore been proposed to regulate contact time by quenching, or quickly cooling the effluent gases leaving the reaction chamber to a temperature below the reactive temperature of the furnace black. Efforts to effect this quenching by means of conventional water spray has necessitated the exercise of extreme care to avoid the disastrous effect of causing spalling of the hot brickwork surfaces. By injecting the cooling water as a fog, in accordance with the present invention, the furnace effluent gases may be quickly quenched without fear of causing spalling of the furnace walls.

In large commercial units for producing furnace carbons, it has heretofore been proposed to combine the effluent gases with carbon black suspended therein from several furnaces in what has been designated a "blending chamber," and passing the combined suspension to a cooling and separating unit. Under certain conditions, it has been found desirable to cool the suspension to a considerable extent in the blending chamber. The use of an ordinary water spray in such blending chamber is frequently not permissible because of excessive spalling of the furnace brickwork when such spray is used. In an operation of this type in which the gases in the breeching leaving the blending chamber were normally at a temperature of 2,390° F., I have injected fog into the blending chamber through two fog-throwing nozzles at the rate of 4.6 gallons of water per minute through each nozzle and thereby lowered the breeching temperature to 1,965° F. This was accomplished without spalling of the furnace brickwork, or otherwise deteriorating the furnace structure abnormally.

Especially with respect to those aspects of my invention in accordance with which the fog is injected into the blending chamber, as just noted, or into the exit end of the reaction chamber to effect quenching, it is particularly desirable to preheat the cooling water to a temperature just short of its vaporizing temperature before injecting it through the fog-throwing nozzles into the gaseous suspension. By thus preheating the water, flashing of the fog into steam is expedited and that affords extra protection against spalling due to the impingement of water particles on the hot furnace walls, or the carrying of unvaporized water through the system, or the carrying down of carbon black as a sludge by unvaporized water droplets. The preheating of the cooling water may, with advantage, be effected by passing the conduit in which the water is conveyed to the fog-throwing nozzles in heat exchange relation with the hot furnace walls, or with the gaseous suspension to be cooled. Care should be taken, however, to avoid vaporization of the water in such conduit prior to its injection into the hot gaseous suspension.

I claim:

1. In the process of cooling suspensions of carbon black in hot effluent furnace gases by introducing water directly into a flowing stream of the hot suspension, the step of preheating the water to a temperature just short of its vaporizing temperature, and then introducing the preheated water into the suspension in the form of a fog.

2. The method of claim 1 in which the mean diameter of the water particles introduced into the hot suspension does not exceed 80 microns.

3. The method of claim 1 in which the mean diameter of the water particles introduced into the hot suspension is within the range of 40–80 microns.

MAURICE R. HOWELL.

REFERENCES CITED

The following references are of record in the file of this patent:

UNITED STATES PATENTS

| Number | Name | Date |
|---|---|---|
| 794,000 | Fischer | July 4, 1905 |
| 1,966,859 | Heinrich | July 17, 1934 |
| 2,238,576 | Heller et al. | Apr. 15, 1941 |
| 2,292,355 | Ayers | Aug. 11, 1942 |
| 2,368,828 | Hanson et al. | Feb. 6, 1945 |